UNITED STATES PATENT OFFICE.

JOKICHI TAKAMINE, OF CHICAGO, ILLINOIS.

PREPARING AND MAKING FERMENTED ALCOHOLIC LIQUORS.

SPECIFICATION forming part of Letters Patent No. 525,819, dated September 11, 1894.

Application filed June 17, 1891. Serial No. 396,610. (No specimens.) Patented in England April 2, 1891, No. 5,700, and October 12, 1891, No. 17,374; in France April 13, 1891, No. 214,033, and October 19, 1891, No. 216,840; in Belgium April 14, 1891, No. 94,522, and October 24, 1891, No. 96,937; in Canada December 12, 1891, Nos. 37,961 and 37,962, and in Austria-Hungary July 2, 1892, No. 40,399, and September 28, 1892, No. 16,519.

*To all whom it may concern:*

Be it known that I, JOKICHI TAKAMINE, a subject of the Emperor of Japan, residing at Chicago, in the county of Cook and State of Illinois, have invented a new and useful Improvement in Preparing and Making Fermented Alcoholic Liquors, of which the following is a specification, and for which I have secured patents in foreign countries as follows: Canada, Nos. 37,961 and 37,962, dated December 12, 1891; Belgium, No. 94,522, dated April 14, 1891, and No. 96,937, dated October 24, 1891; France, No. 214,033, dated April 13, 1891, and No. 216,840, dated October 19, 1891;
Austria-Hungary, No. 40,399, dated July 2, 1892, and No. 16,519, dated September 28, 1892, and Great Britain, No. 5,700, dated April 2, 1891, and No. 17,374, dated October 12, 1891.

The object of this invention is to prepare or manufacture fermented alcoholic liquors or to ferment alcoholic liquors, useful in the arts, for the production of alcohol, whisky, gin, brandy, rum, wines, beer, ale, porter, vinegar, and any other product from alcoholic fermentation, containing a greater percentage of alcohol than has hitherto been done, and of a greater strength or percentage of alcohol in a shorter space of time and more economically than has hitherto been done.
The further object of this invention is to manufacture fermented liquor or to ferment alcoholic liquor, and afterward to dilute it to any desired strength by the addition of water, or any other ingredients for producing the desired products.

In describing my invention, I shall apply the term "tane-koji" or "moyashi" to a mass of steamed rice permeated with matured or ripe microscopic mycelial fungus, *Eurotium* *oryzæ* (Ahlburg), which sown on steamed rice and developed to a certain stage acquires both diastatic and fermenting properties. It has a yellowish moldy appearance. The term tane-koji is sometimes, but rarely applied to the spores or seed of this fungus, which wastes or is shaken or falls from the mass.

I shall apply the generic term "taka-moyashi" to a mass of nourishing substances such as brans of cereals or other substances, fer- tilized by a defined artificial compound and containing fully matured or ripe microscopic mycelial fungi, such as the species *Eurotium oryzæ* (Ahlburg), genus *Aspergillus*, and the genera *Mucor* and *Penecillium* having diastatic and fermenting properties; the spores of which mycelial fungi sown on suitable nourishing substances and developed to a certain stage produce a mass or substance possessing both diastatic and fermenting properties. Taka-moyashi has a moldy appearance, and is of a color largely depending upon the cereals or other substances employed, and also upon the particular species of mycelial fungi used.

I apply the generic term "pure taka-moyashi to the matured spores or seed of these mycelial fungi. The taka-moyashi is thoroughly dried and the spores or seed separated by sifting or otherwise from the cereals or other substances upon which it is grown. The pure taka-moyashi has then the form of a dry powder, consisting of the matured seed cells or spores of the mycelial fungi. There are other methods of making the separation. This powder may be mixed with inert hygroscopic substances such as roasted starch, &c., and placed in air-tight vessels for preservation and transportation.

In my process of making fermented alcoholic liquors, I employ, as a diastase for converting into sugar the starch contained in the grains or other substances employed, taka-koji, or the diastatic portion (taka-koji diastase) of the taka-koji. Taka-koji is made from bran of cereals or other substances, containing the necessary ingredients for the growth of the fungi employed. In making taka-koji, any comminuted cereals or starch containing substances may be employed, but I prefer to use brans of cereals, such as wheat bran, corn bran, rye bran, oat bran and other bran supplying the necessary ingredients for the growth of the fungi; also other substances such as slops (solids) from alcoholic distillation, slop or grain (solid) from beer brewing, bran and slop from glucose, starch factories and seed oil cake. Any bran, husk, sawdust, crash or other fabric, or other similar material saturated with any of the above mentioned slop or other nutritious substances liquids or solids, or both combined, such as paste of cooked cereals, or albuminoid substances may be employed and all other substances whether in their natural state or artificially treated, which contain the necessary ingredients for the growth of the fungi. After being thoroughly steamed and heated for purposes of gelatinizing any starch contained and for the sterilization of the substances, the mass of nourishing substance is allowed to cool down to a temperature below 35° centigrade when about one fifty-thousandth to one ten-thousandth parts in weight of the bran or other substances employed of pure taka-moyashi, or about one-thousandth part to three one-thousandth parts in weight of the bran or other substances employed of the taka-moyashi is added to and thoroughly mixed with the mass of bran or other substances employed.

The pure taka-moyashi is thoroughly mixed with the mass employed, and allowed to develop and multiply under proper manipulation and temperature until the proper stage of growth as taka-koji is attained, indicated by the appearance of the fungous growth. The mass is then cooled down to an ordinary atmospheric temperature and dried, if necessary, and is ready for immediate use. Taka-koji presents in this form a moldy appearance, its color depending largely upon the bran and other substances used, and also on the species of fungi employed. The mass of taka-koji possesses both diastatic and fermenting properties as the result of the growth and development of the fungus, the fermenting property residing in the spores or seed of the fungous plant, and the diastatic property residing in the bran or other substance employed, and the mycelii and other parts of the fungus, growing in and upon the surfaces of such substances. When the diastatic and fermenting properties are both profitably utilized at the same time, the taka-koji may be used in its condition as described. Where taka-koji is used for conversion alone, or where the fermenting power alone of the taka-koji is utilized, the taka-koji after being thoroughly dried, is separated into two parts by passing through a sieve or otherwise, one part containing in the form of a dry, fine powder, the spores of the fungus, or the ferment cells; and the other, containing the bran or other substances employed, which include the diastatic properties of the taka-koji. These two resulting products, the one the ferment cells portion, and the other, the diastase containing part, are used separately and independently of each other. Or the taka-koji may be steeped in water, and the diastatic and fermenting properties may be separated from the substance on which it grows by stirring with water and pressing through coarse fabric whereby the diastase will dissolve in water, and the ferment cells portion become detached and remain suspended in the liquid. These may be separated, the one from the other by filtration, or when the diastatic portion only is required for use, it is extracted by percolation of water through the mass, or the taka-koji may be steeped in water and filtered, the clear solution thus obtained containing the diastatic portion alone.

In my process of making taka-moto any of the cereals or starch containing substances, or substances which supply the necessary ingredients for the growth of the ferment cells may be employed. These cereals or starch containing substances, &c., are first ground to a fine meal, to which about one to three parts in weight of water are added, and in which they are thoroughly cooked, preferably at about a temperature of 155° centigrade under pressure, so that all the starch cells are open and gelatinized. It is then cooled down to a temperature of from 50° to 75° centigrade. To this mass is added from five to twenty per cent. in weight of the mass of cereals or substances used, of taka-koji; but I prefer to add to the mass the diastatic portion (taka-koji diastase) obtained from five to twenty per cent., in weight of the mass, of taka-koji, either in the solid or liquid form, well stirring the mixture for from ten to sixty hours, during which period the thorough conversion of the starch in the mass is effected. The mass is then allowed to cool to about 20° centigrade, being constantly agitated by stirring. There is then added to the solution or mash, the ferment cells portion alone from the same amount of taka-koji that was employed before, either in dry form or with water. The solution or mash is then allowed to remain from two to five days with occasional stirring, care being taken to keep the temperature of the solution or mash not to exceed about 40° centigrade, which is conveniently accomplished by the use of a vessel fitted inside with a coil, through which warm and cold water can be passed at will. When the maximum point in the development and multiplication of the ferment cells is reached which is generally indicated by the change in the taste of the solution or mash, from a sweet to an alcoholic flavor the solution or mash is preferably cooled down to a temperature below 20° centigrade and the taka-moto as made by my process is ready for use.

In my process of making fermented alcoholic liquors, I employ any of the cereals or starch containing substances or substances which supply the necessary ingredients for the alcoholic fermentation. The cereals or starch containing substances, &c., are first ground to a fine meal, which is thoroughly cooked with from one-half to five times the weight of cereals, &c., of water, preferably at a temperature of 155° centigrade under pressure, so that all starch cells are open and gelatinized. The mass is then cooled down to a temperature of from 50° to 70° centigrade. To this mass of cereals or other substances used and thus cooked may be added from three per cent. to twenty per cent. in weight of taka-koji, either ground or unground, but I prefer to add the diastatic portion (taka-koji diastase) of the same quantity of taka-koji, either solid or liquid, ground or unground, and well stirred and kept at the above temperature for from ten minutes to one hour during which period the thorough and complete conversion of the starch contained in the cereals and other substances used, into sugars is made. It is then cooled down to about 20° centigrade. The sugar solution thus prepared is of such strength or composition that the sugars contained in it when converted into alcohol produce the desired strength of alcohol. To the sugar solution thus obtained, or to any other sugar solution obtained in any other way, such as glucose solution, malt extract, inverted cane sugar solution, sirup or molasses solution, &c., from two per cent., to twenty per cent., of taka-moto is added and the process of fermentation or the dissociation of the sugars contained in the solution into alcohol and carbonic acid gas, by the agency of the ferment cells contained in the taka-moto goes on until all the sugars in the solution are dissociated.

In the process of fermentation the taka-moto may be added or introduced into the entire mass of fermentable mash, and the fermentation proceed, until the entire sugar solution has been dissociated, into alcohol and carbonic acid; or, small quantities of the taka-moto and the fermentable mash may be mixed together, forming a ferment-containing mash, and the remainder of the sugar solution or fermentable mash, be added fractionally as the process of fermentation goes on, and when I speak of adding the fermentable sugars fractionally to a ferment-containing mash, I intend by the latter term a mash in which a greater or less quantity of sugar solution, and taka-moto have been mingled together, and the process of fermentation has begun. The object of adding the fermentable sugars fractionally is to keep the mash in a suitable strength of sugars so that the fermentation is not retarded by the presence of too much sugar in the mash at one time. Usual and due precaution is exercised during the process of fermentation.

The percentage of alcohol contained in the fermented liquor produced by the fermentation, is proportionate to the strength of the sugar solution or sugars used.

Alcoholic liquors fermented by the ordinary yeast contain but from six to seven per cent. of alcohol, owing to the inability of the yeast cells to live and work in a solution containing more than six or seven per cent. of alcohol. Therefore, in order to obtain six or seven parts of alcohol one hundred parts of the fermented liquor have to be dealt with throughout the entire process.

By my process a fermented liquor containing a much greater per cent. of alcohol is made owing to the ability of the ferment cells in the taka-moto, increased in ferment power and number by my process of preparing it, to live and work in a solution containing a higher per cent. of alcohol when fermented. Therefore in order to get the same quantity of alcohol as before, I have to deal with only about one-third part of the liquor. Thus the cost of labor and fuel, the amount of capital and the size of the plant are reduced to one-third or thereabout or a given-sized plant can produce three times as much alcohol as by the old process where yeast is employed with the same or nearly the same working expenses.

If the object of the fermentation is for strong or distilled alcoholic liquor, such as whisky, rum, gin, &c., the fermented liquor is subjected to the process of distillation. When the fermentation is for weaker beverages, such as beer, ale, porter, &c., the fermented liquor is previously treated to suit its respective object, such as boiling with hops or scorching of grain, and afterward diluting with water to its desired alcoholic strength, and then charged with air or carbonic acid gas, if required.

I have filed an application in the United States Patent Office for improvements in the art of preparing and making taka-koji, and for separating the diastatic from the fermenting properties thereof; said application being filed June 17, 1891, and its serial number being 396,611. I have also filed an application for improvements in the art of preparing and making taka-moto, Serial No. 396,705, filed June 18, 1891. I make no claim herein to either of said arts or the products of said arts, the same being covered and claimed in said above-mentioned applications.

Having thus described my invention, what I claim as new, and desire to secure by Letters Patent of the United States, is—

1. The process of making a fermentable mash, which consists, first, in cooking a given quantity of the grains of cereals or other starch containing materials in order to gelatinize the starch contained therein; second, adding to said mass in the proportion and at the temperature specified, the diastatic portion of the taka-koji and agitating the same, whereby the convertible material present is converted into sugar; all substantially as described.

2. The process of making a fermented liquor, which consists in cooking a given quantity of the grains of cereals, or other starch containing material until the starch contained therein is gelatinized; adding thereto, in the proportions and at the temperature specified the diastatic portion of taka-koji, until the starch has been converted into sugar, then adding to the fermentable mash thus obtained, at the temperature specified, taka-moto, and allowing fermentation to proceed until completed; all substantially as described.

3. The process of making a fermented liquor, which consists in cooking a given quantity of cereals or other starch containing materials with water, to gelatinize the starch therein contained, and adding thereto, in the proportions and at the temperature specified the diastatic portion of taka-koji; then mixing a small portion of the fermentable mash thus obtained, with taka-moto, to form a ferment-containing mash, and then adding to the ferment mash, the remainder of said fermentable mash fractionally, as the fermentation goes on, in order to keep the solution at the desired strength; whereby the fermentable material present is dissociated into alcohol and carbonic acid gas; all substantially as described.

4. The process of making alcoholic liquor, which consists in cooking by water, a given quantity of the grains of cereals, or other starch containing material, until the starch contained therein is gelatinized; adding thereto in the proportions and at the temperature specified the diastatic portion of taka-koji, until the starch has been converted into sugar; then adding taka-moto to the fermentable mash thus obtained, at the temperature specified, and allowing fermentation to proceed until completed; and finally distilling the product; all substantially as described.

5. The process of making alcoholic liquor, which consists in cooking a given quantity of cereals or other starch containing materials, with water, to gelatinize the starch therein contained, and adding thereto, in the proportions and at the temperature specified, the diastatic portion of taka-koji; then mixing a small portion of the fermentable mash thus obtained, with taka-moto, to form a ferment-containing mash; and then adding to the ferment containing mash, the remainder of said fermentable mash fractionally, as the fermentation goes on, until the fermentable material present, is dissociated, and then distilling the product; all substantially as described.

6. The process of making a fermented liquor which consists in cooking a given quantity of cereals, or other starch containing materials with water, to gelatinize the starch therein contained, and adding thereto in the proportion and at the temperature specified, the diastatic portion of taka-koji; then adding hops and boiling and cooling the mash, and then adding to the wort or liquor thus obtained, at the proper temperature, taka-moto; and allowing the fermentation to proceed until completed; all substantially as described.

JOKICHI TAKAMINE.

Witnesses:
E. V. HITCH,
E. MOONE.